US011338926B2

(12) United States Patent
Dierksmeier

(10) Patent No.: US 11,338,926 B2
(45) Date of Patent: May 24, 2022

(54) AIRCRAFT WITH ELECTRIC PROPULSOR

(71) Applicant: Rolls-Royce North American Technologies Inc., Indianapolis, IN (US)

(72) Inventor: Douglas D. Dierksmeier, Frankin, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 754 days.

(21) Appl. No.: 16/101,005

(22) Filed: Aug. 10, 2018

(65) Prior Publication Data

US 2020/0047896 A1 Feb. 13, 2020

(51) Int. Cl.
| B64D 27/24 | (2006.01) |
| B64D 33/04 | (2006.01) |
| F02K 1/00 | (2006.01) |
| F02K 1/12 | (2006.01) |
| F02K 1/62 | (2006.01) |
| F02K 7/08 | (2006.01) |

(52) U.S. Cl.
CPC .......... *B64D 27/24* (2013.01); *B64D 33/04* (2013.01); *F02K 1/008* (2013.01); *F02K 1/1261* (2013.01); *F02K 1/62* (2013.01); *F02K 7/08* (2013.01); *F05D 2240/128* (2013.01)

(58) Field of Classification Search
CPC ........ B64D 27/24; B64D 33/04; F02K 1/008; F02K 1/1261; F02K 1/62; F02K 7/08; F05D 240/128
See application file for complete search history.

(56) References Cited

U.S. PATENT DOCUMENTS

| 2,753,684 | A | | 7/1956 | Greene | |
| 2,799,989 | A | * | 7/1957 | Kappus | B64C 9/38 239/265.35 |
| 3,248,878 | A | * | 5/1966 | Clark | F02K 1/64 60/229 |
| 4,194,692 | A | | 3/1980 | Dickenson | |
| 5,690,280 | A | | 3/1997 | Smith | |
| 5,615,834 | A | * | 4/1997 | Osman | F02K 1/60 239/265.19 |
| 5,782,431 | A | | 7/1998 | Gal-Or et al. | |
| 5,806,302 | A | | 9/1998 | Cariola et al. | |
| 6,311,928 | B1 | * | 11/2001 | Presz, Jr. | B64D 33/04 239/265.29 |

(Continued)

FOREIGN PATENT DOCUMENTS

| CA | 2943627 A1 * 10/2015 | ............... F02K 1/70 |
| EP | 0292421 A2 * 11/1988 | ............... F02K 1/62 |

(Continued)

OTHER PUBLICATIONS

Extended European Search Report, European Application No. 19190913. 4-1010, dated Dec. 12, 2019, 9 pages.

*Primary Examiner* — Assres H Woldemaryam
*Assistant Examiner* — Aaron M Rodziwicz
(74) *Attorney, Agent, or Firm* — Barnes & Thornburg LLP

(57) ABSTRACT

A propulsor includes an electric motor, a fan unit, and a thrust system positioned downstream of and coupled to the fan unit. The electric motor converts electrical power to mechanical rotation to rotationally drive the fan unit and create an air stream directed towards the thrust control system.

15 Claims, 3 Drawing Sheets

(56) References Cited

U.S. PATENT DOCUMENTS

| | | | |
|---|---|---|---|
| 8,733,080 B2 | 5/2014 | Jones et al. | |
| 8,975,911 B2 | 3/2015 | Maalioune | |
| 9,764,848 B1* | 9/2017 | Vondrell | B64D 27/18 |
| 9,896,191 B2 | 2/2018 | Baker | |
| 2013/0062885 A1* | 3/2013 | Taneja | F01D 15/10 |
| | | | 290/1 A |
| 2014/0239083 A1* | 8/2014 | Suciu | B23P 19/04 |
| | | | 239/11 |
| 2014/0252167 A1* | 9/2014 | Suciu | B64D 29/06 |
| | | | 244/11 OB |
| 2015/0084561 A1* | 3/2015 | Benson | B60L 15/2045 |
| | | | 318/400.23 |
| 2016/0326982 A1 | 11/2016 | Pesyna | |
| 2017/0226963 A1* | 8/2017 | Kopecek | F02K 1/605 |

FOREIGN PATENT DOCUMENTS

| | | | | |
|---|---|---|---|---|
| EP | 2987991 A1 * | 2/2016 | | F02K 1/1207 |
| EP | 2987991 A1 | 2/2016 | | |
| EP | 3193000 A1 * | 7/2017 | | F02K 1/763 |
| EP | 3196452 A1 * | 7/2017 | | F01D 25/24 |
| FR | 3010453 A1 * | 3/2015 | | F02K 1/827 |

\* cited by examiner

AIRCRAFT WITH ELECTRIC PROPULSOR

FIELD OF THE DISCLOSURE

The present disclosure relates generally to a propulsor, and more specifically a propulsor including an electric motor and a thrust control system.

BACKGROUND

Electrified transportation is an area of growing opportunity due to improved charge to weight ratios in various types of batteries. Additionally, there is interest in reducing carbon emissions by turning to electric or hybrid-electric transportation that can use at least some energy from renewable sources. Moreover, electric or hybrid-electric transportation is often quieter than alternative means of transport relying solely on combustion engines.

Air transportation is included in the drive toward more electrified means of travel. In particular, propulsion units that produce thrust for aircraft via electrically driven fans or propellers are being explored as alternatives for conventional, pure-combustion driven alternatives. The incorporation of electrically-driven propulsion units in aircraft provide a number of opportunities for optimizing overall aircraft design and maneuverability.

SUMMARY

The present disclosure may comprise one or more of the following features and combinations thereof.

According to one aspect of the present disclosure, a propulsor adapted to produce thrust for use in an aircraft may include an electric motor and a fan unit. The electric motor converts electrical power to mechanical rotation of the fan unit. The fan unit being rotationally coupled to the electric motor.

In illustrative embodiments, the propulsor further includes a thrust control system positioned aft of the fan unit. The thrust control system interacts with accelerated air as it leaves the fan unit and may provide a variable area nozzle and/or a thrust reverser. The thrust control system can also provide for thrust vectoring in some embodiments.

These and other features of the present disclosure will become more apparent from the following description of the illustrative embodiments.

DETAILED DESCRIPTION OF THE DRAWINGS

Figure 1:
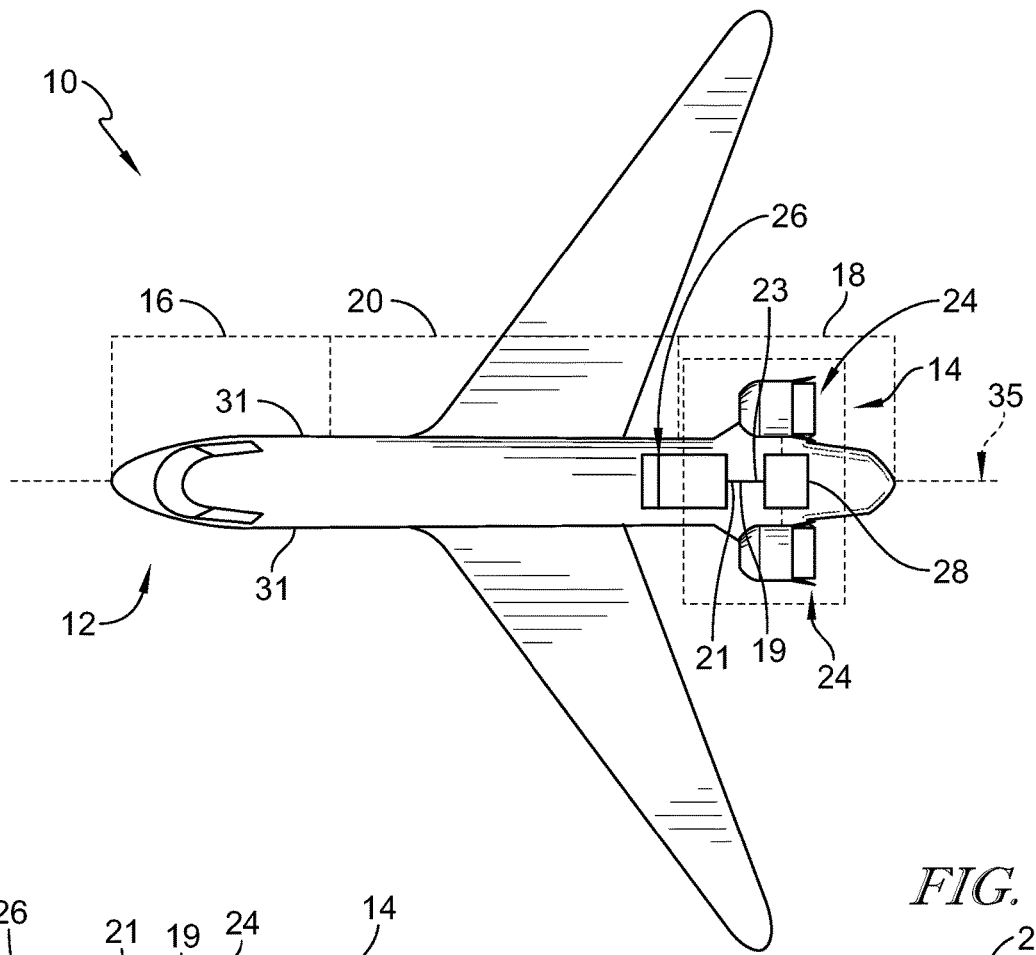
FIG. 1 is a top plan view of a pair of electrically driven propulsors integrated into an aircraft showing that each propulsor includes a thrust control system for directing air flow produced by a fan unit.

For the purposes of promoting an understanding of the principles of the disclosure, reference will now be made to a number of illustrative embodiments illustrated in the drawings and specific language will be used to describe the same.

An illustrative aircraft 10 includes an airframe 12 and a propulsion system 14 coupled to and at least partially located within the airframe 12 as shown in FIG. 1. The propulsion system 14 includes electrically-driven propulsors 22, 24 that accelerate air to push the aircraft 10. Each propulsor 22, 24 includes a thrust control system 34 positioned at the aft (rear) end 44 of the propulsor 22. The thrust control system 34 interacts with all the accelerated air as it leaves the associated propulsor 22, 24 and provides a variable area nozzle and/or thrust reverser for the associated propulsor 22, 24.

Figure 3:
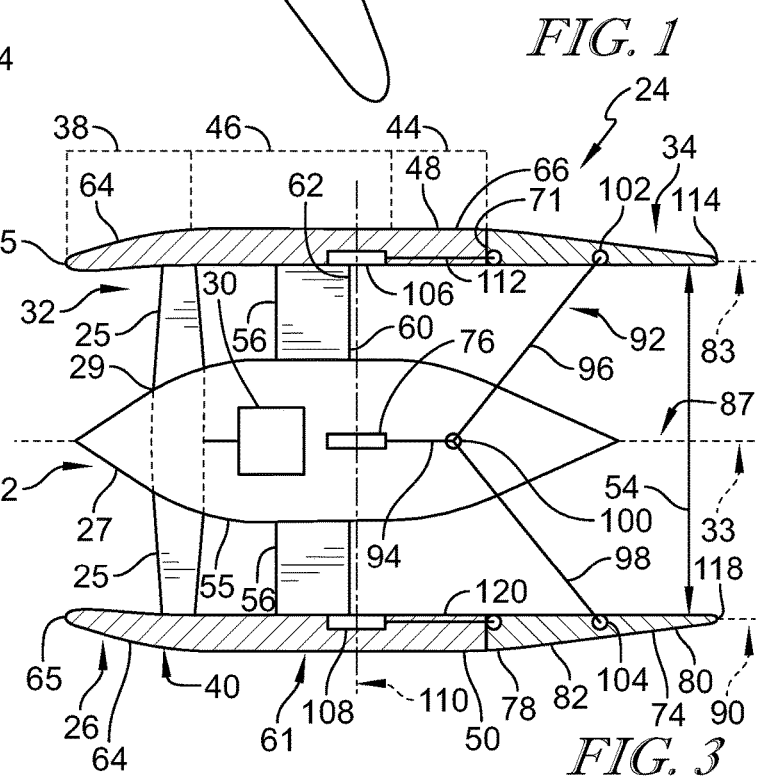
FIG. 3 is a cross-sectional view of the propulsor similar to FIG. 2 showing that each propulsor includes an electric motor, a fan unit coupled to the electric motor, and a thrust control system coupled to the fan unit.

To form and manipulate the air stream, the propulsors 22, 24 include the electric motor 30, a fan unit 32 coupled to the electric motor 30, and a thrust control system 34 as shown in FIG. 3. The electric motor 30 and the fan unit 32 use electrical power provided to the motor 30 to accelerate an air stream. Illustratively, the air stream is manipulated using the thrust control system 34 such that the area of the nozzle 54 may be changed.

Changes in the area of the nozzle 54 via adjustment of the thrust control system 34 can alter the air stream by increasing or decreasing the velocity of the air upon exiting the nozzle 54. Moreover, the thrust control system 34 may be used to reverse the air stream as it moves out of the nozzle 54 to create and apply a reverse thrust force upon the aircraft 10 as suggested in FIG. 5. In some embodiments, a thrust control system 34 can be provided that allows for changing the angle of discharge for accelerated air as shown in FIG. 6.

The thrust control system 34 includes a first flap 72 and a second flap 74 as shown in FIG. 3. A rotation actuator 76 is coupled to both flaps 72, 74 and drives rotation of the flaps 72, 74 so as to open or close the area of the nozzle 54 as suggested in FIG. 4. Slide actuators 106, 108 are each coupled to a corresponding flap 72, 74 to slide the flaps 72, 74 away from the fan unit so that the accelerated air can be reversed as shown in FIG. 5.

The overall airframe 12 of the exemplary aircraft 10 includes a fore section 16, an aft section 18 spaced apart from the fore section 16, and a mid-section 20 extending therebetween. The propulsion system 14 is positioned at the aft section 18 of the airframe 12 to propel the aircraft 10.

Figure 2:
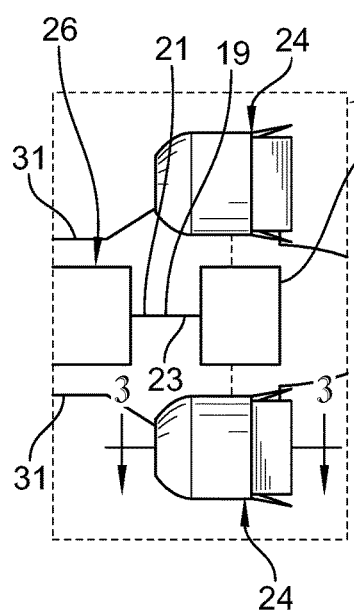
FIG. 2 is a top plan view of the pair of propulsors of FIG. 1 diagrammatically showing a gas turbine engine and a generator/battery that is electrically coupled with each of the propulsors.

The propulsion system 14 illustratively includes a pair of electrically-driven propulsors 22, 24 along with a gas turbine engine 26 and a generator and/or battery 28 as shown in FIG. 2. Each of the pair of electrically-driven propulsors 22, 24 are coupled to the airframe 12 opposite one another and are in electric communication with the generator/battery 28. The gas turbine engine 26 is rotatably coupled to the generator 28 via a turbine drive shaft 19. The generator/battery 28 is in electric communication with each of the pair of propulsors 22, 24, as seen in FIGS. 1 and 2.

The generator/battery 28 is more specifically coupled to a turbine drive shaft 19 as shown in FIGS. 1 and 2. The generator 28 is further in electric communication with each of the pair of electrically-driven propulsors 22, 24. Illustratively, the generator/battery 28 communicates with a pair of electric motors 30 located within each of the propulsors 22, 24. The generator/battery 28 is configured to receive the mechanical energy produced by the gas turbine engine 26 and convert it into electric energy. Further, the generator/battery 28 is configured to store the electric energy until instructed to drive the pair of electric motors 30. When instructed, the generator/battery 28 drives the electric motors 30 to power the propulsors 22, 24 using the stored electric energy that the generator/battery 28.

In some embodiments, the aircraft 10 may be completely electric and run on stored energy in a battery-only element. In such embodiments, no engine or generator is included. Moreover, other hybrid or engine driven arrangements are also contemplated. For example, the fan units The electrically-driven propulsors 22, 24 are coupled to the aft section 18 of the airframe 12 and spaced apart from one another such that the propulsors 22, 24 are positioned at a pair of lateral sides 31 of the airframe 12. The propulsors 22, 24 are substantially identical to one another. In other embodiments, however, the propulsion system 14 may include any suitable number of propulsors 22, 24 other than the two propulsors 22, 24.

The electrically-driven propulsors 22, 24 are formed to include a front end 38, a rear end 44 spaced apart from the front end 38, and mid-section 46 extending therebetween along a central axis 33. The propulsors 22, 24 are further defined by an upper segment 48 extending along the central axis 33 and spaced apart from a lower segment 50 sized to extend substantially the same length as the upper segment 48.

Illustratively, the upper and lower segments 48, 50 cooperate to form an entrance aperture 52 at the front end 38 of the propulsors 22, 24 and a nozzle 54 at the rear end 44 of the propulsors 22, 24. The entrance aperture 52 and nozzle 54 allow for a stream of air to be formed upon entering the propulsors 22, 24 at the entrance aperture 52 and flow through the propulsors 22, 24 to the nozzle 54. While flowing through the propulsors 22, 24, the air stream is retained between the upper and lower segments 48, 50 such that the only means of exit for the air stream is the nozzle 54.

The electric motor 30 is illustratively coupled to and positioned at the mid-section 46 of the propulsor 22, 24 and in electric communication with the generator 28. Although, in some embodiments the motor 30 may be positioned at any end/section 38, 44, 46 of the propulsor 22, 24 so long as the motor 30 is in electric communication with the generator 28. As such, the motor 30 is configured to receive the electric energy formed within the generator 28 and communicate the electric energy to the fan unit 32 upon actuation of the generator 28.

The provided electric energy drives the fan unit 32 such that it rotates about the central axis 33, and, thereby, converts the electrical energy back into mechanical energy. To do so, the motor 30 is configured to power rotation of the fan unit 32 at a predetermined rate based on engine 26 operating conditions. In the illustrative embodiment, the motor 30 is controlled by an electronic controller (not shown) and powered by the generator 28 in communication with the engine 26.

Illustratively, an electric motor 30 is located within each of the propulsors 22, 24 such that each propulsor 22, 24 may be controlled independently of the other as shown in FIG. 3. Although, in other embodiments each of the motors 30 may be configured to simultaneously respond to actuation of the propulsors 22, 24. Further, each of the pair of electric motors 30 is substantially identical to one another. In other embodiments, however, the propulsors 22, 24 may include any suitable number of electric motors 30 other than the one electric motor 30 located in each propulsor 22, 24 and in electric communication with the fan units 32.

A fan unit 32 is located within each of the propulsors 22, 24 and is configured to convert the electric energy in the motor 30 to mechanical energy by rotation of the fan unit 32 so to produce an air stream. Illustratively, the fan unit 32 creates the air stream by rotating about the central axis 33. The fan unit 32 includes a nacelle structure 40 and a fan rotor 42 formed as a plurality of blades 25 extending from a rotation hub 27 coupled directly to the electric motor 30. As such, the fan rotor 42 is configured to rotate about the central axis 33 as defined by the nacelle structure 40 in response to actuation of the motor 30, thereby producing the air stream.

The nacelle structure 40 and the fan rotor 42 cooperate to direct the air stream away from the fan rotor 42 towards the thrust control system 34 and the nozzle 54. Upon reaching the nozzle 54, the air stream exits the constraints formed by the nacelle structure 40 such that the aircraft 10 is thrust/moved in a forward direction opposite the flow of the air stream through the nacelle structure 40. In some embodiments, the air stream is blocked from leaving the nacelle structure 40 and is instead redirected back towards the fan rotor 42 so that the aircraft 10 is thrust in a backwards direction opposite the forward direction.

The fan rotor 42 is positioned at the front end 38 of the propulsor 22, 24 and extends between the upper and lower segments 48, 50 such that the fan rotor 42 remains unengaged by the upper and lower segments 48, 50. The fan rotor 42 includes the rotation hub 27 coupled to the electric motor 30 and the plurality of blades 25 coupled to and extending away from the rotation hub at a first end 29 of the blades 25. The rotation hub 27 of the fan rotor 42 is configured to rotate about the central nacelle axis 33 upon actuation of the electric motor 30. In response to actuation of the electric motor 30, the blades 25 coupled to the rotation hub 27 rotate in substantially the same direction as the rotation hub 27.

The fan rotor 42 is located at the entrance aperture 52 and is configured to create the air stream by pulling air into the respective propulsor 22, 24 by the vortex formed by rotation of the fan rotor 42. Therefore, upon rotation of the fan rotor 42, a portion of the untreated, environment air located outside of and surrounding the aircraft 10 is pulled into the entrance aperture 52 of the propulsor 22, 24, formed into the air stream, and directed through the nacelle structure 40 towards the nozzle 54. In additional embodiments, other fans known in the art may be used in the contemplated design (i.e.: using a rotation shaft, etc.)

Figure 4:
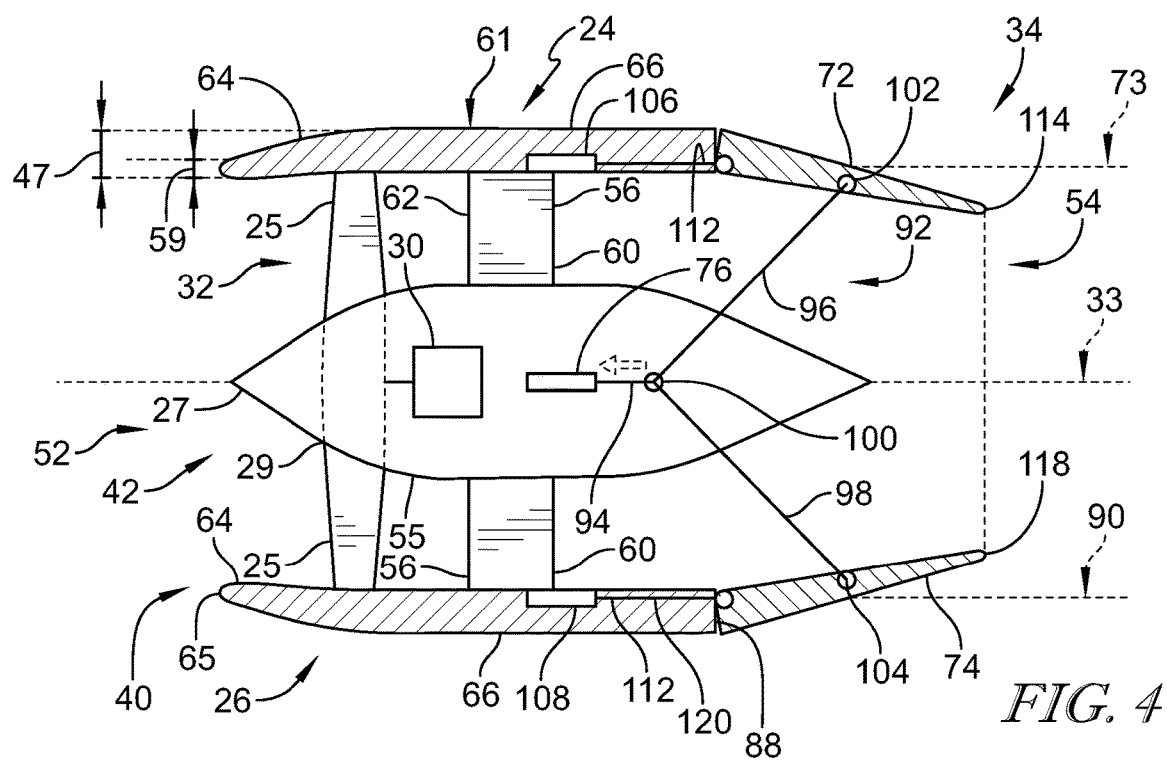
FIG. 4 is a cross-sectional view of the propulsor taken along line 3-3 of FIG. 2 showing the thrust control system in a vectored thrust configuration.
Figure 5:
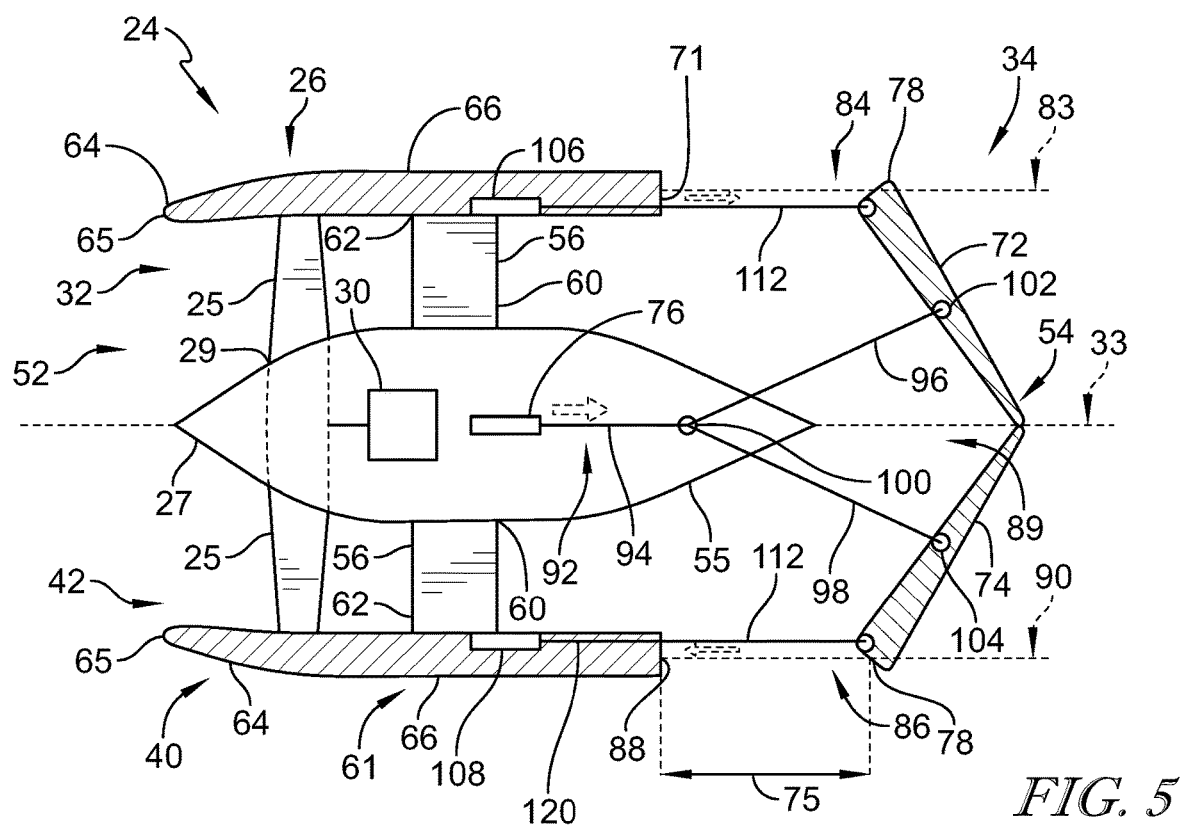
FIG. 5 is a cross-sectional view of the propulsor similar to FIG. 2 showing the thrust control system in a reverse thrust configuration.
Figure 6:
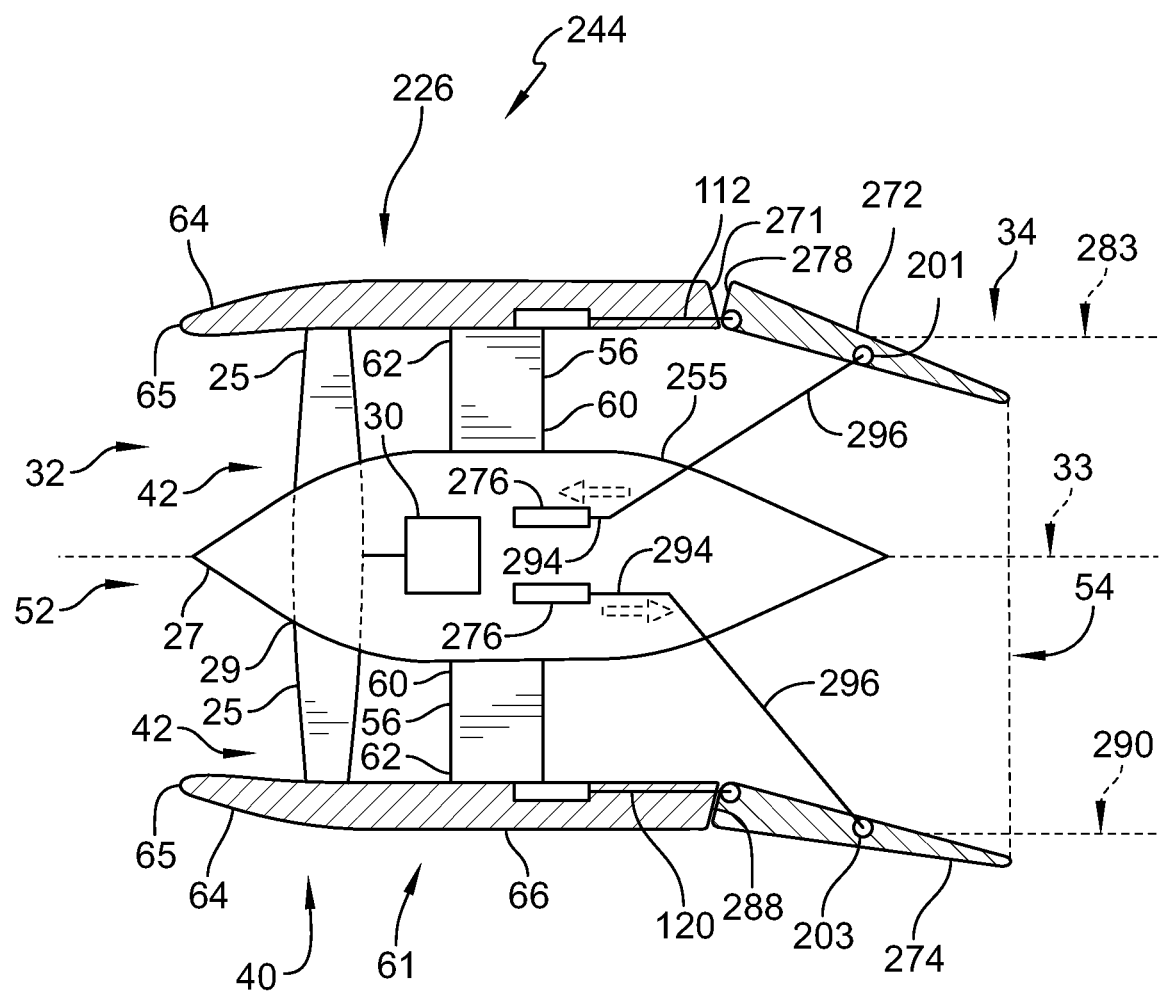
FIG. 6 is a cross-sectional view similar to FIGS. 3-5 of a second embodiment of the propulsor showing that the thrust control system may further include a second central actuator configured to drive rotation of flaps about respective axes of either the first flap or the second flap independent of one another.

Referring now to FIGS. 3-5, the nacelle structure 40 is coupled to the airframe 12 and mounted to the electric motor 30 and thrust control system 34. The nacelle structure 40 has a hub 55 arranged along the central nacelle axis 33 that surrounds at least a portion of the electric motor 30. The electric motor 30 and fan rotor 42 are configured to generate thrust to move the aircraft 10 while being supported in the nacelle structure 40. The nacelle structure 40 is configured to guide the air stream formed by the fan rotor 42 towards the thrust control system 34. The nacelle structure 40 further includes a fan case 61 spaced apart from the hub 55 and arranged around at least a portion of the fan rotor 42 about the central nacelle axis 33 and a plurality of guide vanes 56 extending between and coupled to the hub 55 at a first end 60 and the fan case 61 at a second end 62.

Illustratively, the fan case 61 is positioned aft of the fan rotor 42 so that the air stream formed by the fan rotor 42 interacts with the guide vanes 56 and all of the air stream moves through the nacelle structure 40. As a result of the rotation of the fan rotor 42 and the size and shape of the fan case 61 and guide vanes 56, the air stream within the nacelle structure 40 has a speed of acceleration faster than the untreated, environment air located outside of the nacelle structure 40.

The hub 55 of the nacelle 40, as shown in FIG. 3, is coupled to the airframe 12 and extends along the central nacelle axis 33 between the entrance aperture 52 and the rear end 44 of the propulsors 22, 24. Illustratively, the hub 55 is sized to house at least a portion of the electric motor 30 and the rotation hub of the fan rotor 42. The blades 25 coupled to the rotation hub 27 of the fan rotor 42 are positioned within the fan case 61 such that at least a portion of the blades 25 are surrounded by the fan case 61.

Illustratively, the fan case 61 is sized to surround the entirety of the nacelle hub 55 and fan rotor 42 such that substantially all of the blades 25 are positioned within the fan case 61. Further, the fan case 61 extends along the central nacelle axis 33 forming the front end 38, mid-section 46, and rear end 44 of the propulsor 22, 24 and defining the entrance aperture 52 and nozzle 54. Illustratively, the fan case 61 is shaped to transition from a substantially round shaped portion 64 to a substantially rectangular shaped portion 66 aft of the guide vanes 56. The transition from the round to rectangular shape (and/or vice versa) occurs along the mid-section 46 of the propulsor 22, 24.

The round shaped portion 64 of the fan case 61 is sized to extend around the fan rotor 42 and is located at the front end 38 of the propulsor 22, 24 such that the round shaped portion 64 terminates at a rounded end 65 of the fan case 61 thereby forming the entrance aperture 52. The rectangular shaped portion 66 is sized to extend around a portion of the hub 55 and terminates at a planar aft surface 71 located at the rear end 44 of the propulsor 22, 24. Illustratively, the planar aft surface 71 is positioned aft of the guide vanes 56 and is formed to extend perpendicular to the central nacelle axis 33. The planar aft surface 71 is configured to interact with the thrust control system 34 formed in the propulsor 22, 24. As such, the fan case 61 cooperates with the thrust control system 34 to maintain and direct the entire air stream within the nacelle structure 40 such that no substantial portion of the air stream escapes from the nacelle 40 until reaching the nozzle 54 formed by the thrust control system 34.

Maintaining a large percentage of the air stream within the nacelle structure 40 leads to a large amount of the air stream reaching the guide vanes 56 and the thrust control system 34. As will be discussed in detail below, an increased amount of the air stream reaching the guide vanes 56 and the thrust control system 34 leads to a greater potential thrust output.

Each of the guide vanes 56 are spaced circumferentially apart from each other and located within the nacelle structure 40, as shown in FIGS. 3-5. Further, the guide vanes 56 are sized to extend between the fan case 61 and the hub 55 at the mid-section 46 of each of the propulsors 22, 24 such that the guide vanes 56 are coupled to the hub 55 at the first end 60 of the guide vanes 56 and the fan case 61 at the second end 62 of the guide vanes 56.

Illustratively, the guide vanes 56 extend perpendicular to the central nacelle axis 33 and terminate at a 90 degree angle at both ends 60, 62. The guide vanes 56 are substantially identical to one another. In other embodiments, however, the nacelle structure 40 may include any suitable number of guide vanes 56 other than the two guide vanes 56. As such, the guide vanes 56 are configured to interact with the stream of air formed by the fan rotor 42 and guided into the nacelle structure 40 prior to the air stream reaching the thrust control system 34 and, further, direct the air stream towards the thrust control system 34.

Referring to FIG. 3, the thrust control system 34 is movably coupled to the nacelle structure 40 such that the planar aft surface 71 of the fan case 61 engages a portion of the thrust control system 34 aft of the guide vanes 56. As such, the thrust control system 34 is the next structure movable relative to the nacelle structure 40 and, therefore, interacts with the entirety of the stream of air as it exits the nacelle 40 at the nozzle 54 formed by the thrust control system 34. The thrust control system 34 is configured to alter the size and shape of the nozzle 54 so to provide a variable area nozzle and thrust reverser 54 configured to provide thrust for the aircraft 10 and alter the direction and velocity of exit of the air stream flowing through the propulsor 22, 24. The adjustability of the nozzle 54 allows for the propulsors 22, 24 to adjust the direction of flight of the aircraft 10 upon actuation of the propulsors 22, 24. Actuation of the propulsors 22, 24 directly correlates with actuation of the generator 28 as the generator 28 is configured to communicate the electric energy stored within to the electric motor 30.

As discussed in detail above, upon receiving the flow of electric energy, the electric motor 30 formed within each of the propulsors 22, 24 is configured to actuate (either automatically or manually) and further communicate the electric energy to the fan unit 32. This electric energy rotates the fan unit 32 about a central nacelle axis 33 relative to a nacelle structure 40 included in the fan unit 32 thereby converting the electric energy into mechanical energy and forming the air stream. As the air stream flows through the propulsor 22, 24 towards the nozzle 54, the air stream engages the hub 55, the fan case 61, the guide vanes 56, and the thrust control system 34. Illustratively, the hub 55, fan case 61, and guide vanes 56, are positioned such that they engage the air stream prior to the thrust control system 34.

Referring to FIG. 3, the thrust control system 34 includes a first flap 72, a second flap 74 spaced apart from the first flap 72, and a rotation actuator 76 coupled to both flaps 72, 74. The first flap 72 and second flap 74 are positioned such that they form the nozzle 54 therebetween and are moveable relative to the central nacelle axis 33. The rotation actuator 76 is configured to adjust the spacing between the flaps 72, 74 such that the height of the nozzle 54 is altered so to achieve a desired thrust.

Illustratively, to increase the thrust produced by the propulsors 22, 24, the nozzle height is configured to be decreased such that the air stream exits the propulsor 22, 24 at an increased velocity. To reverse the thrust, the first flap 72 is configured to engage the second flap 74 so that the air stream is blocked from exiting the nozzle 54. Further, as shown in FIG. 4, the direction of the air stream may be altered by moving the flaps 72, 74 via the rotation actuator 76. This allows for the thrust to exit from the propulsor 22, 24 at a variety of angles relative to the central nacelle axis 33 and, thereby, modify the direction of the aircraft 10.

As shown in FIG. 3, the first flap 72 is formed to include a first end 78 spaced apart from a second end 80 and a middle section 82 extending therebetween. The first flap 72 is movably coupled to the planar aft surface 71 of the fan case 61 of the nacelle structure 40 at the first end 78 such that the second end 80 extends away from the fan case 61 about a first-flap axis 83. The first flap 72 is configured to rotate about the first-flap axis 83 in response to actuation of the rotation actuator 76.

Illustratively, the first end 78 is formed as a planar surface and positioned at a substantially 90 degree angle relative to the first-flap axis 83 and sized to be the same height as the planar surface 71 of the fan case 61. Prior to actuation of the rotation actuator 76, the first flap 72 is in a first position as shown in FIG. 3. Illustratively, the first position of the first flap 72 is achieved when the first end 78 of the first flap 72 engages the entirety of the planar surface 71 of the fan case 61 such that no space is present between the first flap 72 and the fan case 61. Such an interaction of the first flap 72 and the fan case 61 provides an air stream having a base velocity upon exiting along the propulsor 22, 24.

Further, the middle section 82 of the first flap 72 extends at a slight decline relative to the first-flap axis 83 and terminates at the second end 80 of the first flap 72 as shown in FIGS. 3 and 4. Illustratively, the second end 80 is rounded and configured to cooperate with the second flap 74 to block the air stream from exiting the propulsor 22, 24 at the nozzle 54 as shown in FIG. 5. The first and second flap 72, 74 provide a blockade by which air stream is reversed and directed away from the nozzle 54. The velocity of the air stream is slightly decelerated and guided outwardly away from the central nacelle axis 33 towards a first and second thrust reverse aperture 84, 86. Such apertures 84, 86 are formed upon extension of the flaps 72, 74 away from the fan case 61 such that a distance 75 is created between the planar surface of the fan case 61 and the first end 78 of the first flap 72.

The second flap 74 is substantially similar to the first flap 72 and cooperates with a second planar surface 88 of the fan case 61 in substantially the same manner as the first flap 72 discussed above. Differing from the first flap 72, the second flap 74 is configured to rotate about a second-flap axis 90 extending along the center of the second flap 74. Although the flaps 72, 74 are configured to rotate about distinct axes 83, 90, the second flap 74 is configured to move at substantially the same time and in the substantially the same direction as the first flap 72. Further the flaps 72, 74 are selectively movable from a first configuration (as shown in FIG. 3) and a second configuration (as shown in FIG. 5). The first configuration therein defines a first area 87 through which the accelerated air passes as it exits the nozzle 54, and the second configuration therein defines a second area 89 through which the accelerated air passes as it exits the nozzle 54. In other embodiments, the flaps 72, 74 are configured to move independent of each other. The paired movement of the flaps 72, 74 is due to the shared rotation actuator 76 located in the hub 55 and positioned along the central nacelle axis 33. In other embodiments, there may be more than one rotation actuator 76 such that each flap 72, 74 is coupled to its own rotation actuator 76 and configured to move independent of each other as shown in FIG. 6.

The rotation actuator 76 is positioned along the central nacelle axis 33 and configured to translate desired movement to the flaps 72, 74 upon actuation of the rotation actuator 76. As shown in FIG. 4, the rotation actuator 76 conveys movement to the flaps 72, 74 via a plurality of central links 92 extending between and coupled to the rotation actuator 76 and each of the flaps 72, 74. Illustratively, there are three central links 92 such that a first link 94 extends from the rotation actuator 76 to a second link 96 and a third link 98 such that all three central links 94, 96, 98 extend from a common point 100. The second link 96 is sized to extend from the common point 100 and couple to a midpoint 102 of the first flap 72. The midpoint 102 of the first flap 72 is located along the mid-section 82 of the first flap 72 and positioned at substantially the center of the first flap 72. The third link 98 is formed substantially similar to the second link 96 and extends from the common point 100 to a midpoint 104 of the second flap 74. The midpoint 104 of the second flap 74 is positioned in substantially the same manner as the midpoint 102 of the first flap 72. The central links 92 are configured to move in response to the actuator 76 and thereby move the flaps 72, 74.

The length of the first link 94 is formed to either increase or decrease. Illustratively, the first link 94 is configured to change lengths and move between a relaxed position (shown in FIG. 3), a retracted position (shown in FIG. 4), and an extended position (shown in FIG. 5). The first link 94 having the shortest length in the retracted position and the longest length in the extended position. Illustratively, the second and third links 94, 96 are not formed to change in length. As such, the second and third links 94, 96 are configured to move in response to movement of the first link 94 between the three aforementioned positions.

Illustratively, upon retracting the first link 94, as shown in FIG. 4, the second and third links 94, 96 remain the same length and rotate the flaps 72, 74 inward about the first-flap axis 83. Further, as shown in FIG. 5, upon extension of the rotation actuator 76, the second and third links 94, 96 remain the same length and move the flaps 72, 74 out of engagement with the fan case 61 to create a space therebetween. Further, the placement of the midpoints 102, 104 as shown in FIG. 5 rotates the flaps 72, 74 inward about the respective axis 83, 90 such that the second end 80 of each of the flaps 72, 74 are engaged and block the nozzle 54.

The thrust control system 34 may further include a first slide actuator 106 and a second slide actuator 108 as shown in FIGS. 3-5. The slide actuators 106, 108 are configured to cooperate with the flaps 72, 74 to rotate each flap 72, 74 about its respective axis 83, 90 and/or create space between the fan case 26 and the flaps 72, 74.

Illustratively, the first slide actuator 106 is positioned in an top side 122 of the fan case 26 and the second slide actuator 108 is positioned in a bottom side 124 of the fan case 26 such that the first slide actuator 106, the rotation actuator 76, and the second slide actuator 108 are spaced apart from each other and vertically aligned along a center vertical axis 110. The first slide actuator 106 is movably coupled to the first flap 72 via a top-outer link 112 extending from the first slide actuator 106 to an end point 114 of the first flap 72. The top-outer link 112 is configured to increase the length of the top-outer link 112 such that the top-outer link 112 moves the first flap 272 away from the fan case 226.

Illustratively, the top-outer link 112 extends simultaneously with the first link 94 coupled to the rotation actuator 76. Similarly, upon retraction of the first link 94, the top-outer link 112 is also retracted. The second slide actuator 108 is movably coupled to an end point 118 formed in the second flap 74 via a bottom-outer link 120 and is configured to move the second flap 74 in substantially the same manner that the top-outer link 112 moves the first flap 72 as discussed above. Further, the slide actuators 106, 108 and the rotation actuator 76 move in relation to one another such that the movement of one actuator 106, 108, 76 creates similar movement in the remaining actuators 106, 108, 76.

A second thrust control system 234 is shown in FIG. 6 of the present disclosure. The thrust control system 234 is substantially similar to the thrust control system 34 shown in FIGS. 1-5, and described above. Accordingly, the description of the thrust control system 34 is hereby incorporated by reference to apply to the thrust control system 234 except as it departs from the further description and drawings of the thrust control system 34.

Thrust control system 234 differs from thrust control system 34 in that the system further includes a second rotation actuator 228. The planar surfaces 271 and 288 of the flaps 272, 274 also differ as the planar surfaces 271, 28 are shaped to angle inward towards the central nacelle axis 33. The second rotation actuator 228 is located within the hub 255 and configured to cooperate with the first rotation actuator 226 to rotate the flaps 272, 274 about each respective axis 83, 90. The rotation actuators 226, 228 are spaced apart from each other such that one of the rotation actuators 226, 228 is positioned above the central nacelle axis 33 and the remaining rotation actuator 226, 228 is positioned below the central nacelle axis 33.

Illustratively, both rotation actuators 226, 228 extend parallel to the central nacelle axis 33. Further, each of the rotation actuators 226, 228 cooperate with a first central link 294 coupled to and extending from the respective actuator 226, 228 towards the flaps 272, 274. The first central link 294 terminates at and is coupled to a second central link 296. The second central link 296 extends from the first central link 294 and is coupled to a midpoint 201, 203 of each of the flaps 272, 274. As such, each flap 272, 274 is configured to be moved independent of the other such that one flap 272, 274 may rotate away from the central nacelle axis 33 while the other flap 272, 274 rotates towards the central nacelle axis 33. This allows for an increased variety of positions to which the rotation actuators 226, 228 may move the flaps 272, 274 so to form a plurality of heights and angles of the nozzle 54.

In some embodiments, a propulsor is adapted to produce thrust for use in an aircraft. The propulsor comprises an electric motor configured to convert electrical power to mechanical rotation, a fan unit including a nacelle structure, and a fan rotor coupled to the electric motor to be rotationally driven by the electric motor about a central axis relative to the nacelle structure. The nacelle structure includes a hub arranged along the central axis, a fan case arranged around the fan rotor and the central axis, and guide vanes that extend from the hub to the fan case aft of the fan rotor so that all accelerated air discharged from the fan rotor interacts with the guide vanes as all the accelerated air moves through the nacelle structure.

The propulsor further includes a thrust control system coupled to the nacelle structure and located immediately aft of the guide vanes so that the thrust control system is the next structure movable relative to the nacelle structure that interacts with all the accelerated air as it leaves the nacelle structure. The thrust control system is configured to provide a variable area nozzle and thrust reverser.

According to another aspect of the present disclosure, the thrust control system includes a first flap mounted to rotate about a first-flap axis and a rotation actuator coupled to the first flap to drive movement of the first flap about the first-flap axis.

According to another aspect of the present disclosure, the thrust control system includes a second flap mounted to rotate about a second-flap axis and the rotation actuator is configured to drive movement of the second flap about the second flap axis.

According to another aspect of the present disclosure, the rotation actuator is housed in the hub of the nacelle structure, is configured to extend and retract along the central axis, and is coupled to the first flap and the second flap by a plurality of links extending outward from the hub.

According to another aspect of the present disclosure, the fan case is shaped to transition from a round shape portion that extends around the fan rotor to a rectangular shape portion aft of the guide vanes.

According to another aspect of the present disclosure, the first flap and the second flap are each mounted to slide along the central axis relative to the nacelle structure from a first position abutting an aft end of the fan case to a second position spaced apart from the aft end of the fan case.

According to another aspect of the present disclosure, the thrust control system includes a first slide actuator coupled to the first flap to drive motion of the first flap along the central axis and a second slide actuator coupled to the second flap to drive motion of the second flap along the central axis.

According to another aspect of the present disclosure, the fan case is shaped to transition from a round shape portion that extends around the fan rotor to a rectangular shape portion aft of the guide vanes. The first slide actuator is housed in the rectangular shape portion of the fan case along a top side of the fan case and the second slide actuator is housed in the rectangular shape portion of the fan case along a bottom side of the fan case.

In some embodiments, the propulsor comprises a fan unit including a nacelle structure and a fan rotor configured to be rotationally driven by an electric motor about a central axis relative to the nacelle structure. The nacelle structure including a hub arranged along the central axis, a fan case arranged around the fan rotor and the central axis, and guide vanes that extend from the hub to the fan case aft of the fan rotor so that all accelerated air discharged from the fan rotor interacts with the guide vanes as all the accelerated air moves through the nacelle structure. The propulsor further includes a thrust control system coupled to the nacelle structure and located immediately aft of the guide vanes so that the thrust control system is the next structure movable relative to the nacelle structure that interacts with all the accelerated air as it leaves the nacelle structure.

According to another aspect of the present disclosure, the thrust control system includes a first flap mounted to rotate about a first-flap axis and a second flap mounted to rotate about a second-flap axis. The first flap and the second flap are selectively movable from a first configuration defining a first area through which all the accelerated air passes as it leave the propulsor to a second configuration defining a second area through which all the accelerated air passes as it leaves the propulsor.

According to another aspect of the present disclosure, the thrust control system includes a rotation actuator configured to drive movement of both the first flap and the second flap about the respective first flap axis and the second flap-axis.

According to another aspect of the present disclosure, the rotation actuator is housed in the hub of the nacelle structure, is configured to extend and retract along the central axis, and is coupled to the first flap and the second flap by links extending outward from the hub.

According to another aspect of the present disclosure, the fan case is shaped to transition from a round shape portion that extends around the fan rotor to a rectangular shape portion aft of the guide vanes.

According to another aspect of the present disclosure, the first flap and the second flap are each mounted to slide along the central axis relative to the nacelle structure from a first position abutting an aft end of the fan case to a second position spaced apart from the aft end of the fan case.

According to another aspect of the present disclosure, the thrust control system includes a first slide actuator coupled to the first flap to drive motion of the first flap along the central axis and a second slide actuator coupled to the second flap to drive motion of the second flap along the central axis. The fan case is shaped to transition from a round shape portion that extends around the fan rotor to a rectangular shape portion aft of the guide vanes. The first slide actuator is housed in the rectangular shape portion of the fan case along a top side of the fan case. The second slide actuator is housed in the rectangular shape portion of the fan case along a bottom side of the fan case.

In some embodiments, an aircraft comprises an airframe, an electric motor, and a propulsor including a fan unit configured to provide accelerated air and a thrust control system configured to provide a variable area nozzle and thrust reverser that interacts with accelerated air from the fan unit. The fan unit includes a nacelle structure and a fan rotor coupled to the electric motor for rotation about a central axis relative to the nacelle structure. The nacelle structure includes a hub arranged along the central axis, a fan case arranged around the fan rotor and the central axis, and guide vanes that extend from the hub to the fan case aft of the fan rotor so that all accelerated air discharged from the fan rotor interacts with the guide vanes as all the accelerated air moves through the nacelle structure. The thrust control system is coupled to the nacelle structure and located immediately aft of the guide vanes so that the thrust control system is the next structure movable relative to the nacelle structure that interacts with all the accelerated air as it leaves the nacelle structure.

According to another aspect of the present disclosure, the thrust control system includes a first flap mounted to rotate about a first-flap axis and a second flap mounted to rotate about a second-flap axis, and the first flap and the second flap are selectively movable from a first configuration defining a first area through which all the accelerated air passes as it leave the propulsor to a second configuration defining a second area through which all the accelerated air passes as it leaves the propulsor.

According to another aspect of the present disclosure, the first flap and the second flap are each mounted to slide along the central axis relative to the nacelle structure from a first position abutting an aft end of the fan case to a second position spaced apart from the aft end of the fan case.

According to another aspect of the present disclosure, the fan case is shaped to transition from a round shape portion that extends around the fan rotor to a rectangular shape portion aft of the guide vanes. The first flap is mounted to slide along the central axis relative to the nacelle structure from a first position abutting an aft end of the fan case along a top side of the rectangular shape portion to a second position spaced apart from the aft end of the fan case. The second flap is mounted to slide along the central axis relative to the nacelle structure from a first position abutting an aft end of the fan case along a bottom side of the rectangular shape portion to a second position spaced apart from the aft end of the fan case.

According to another aspect of the present disclosure, the thrust control system includes a first slide actuator coupled to the first flap to drive motion of the first flap along the central axis and a second slide actuator coupled to the second flap to drive motion of the second flap along the central axis.

A variable area nozzle and thrust reverser is provided by a thrust control system 34 as shown in FIG. 3. The design shown is an electrically driven one stage fan with top, bottom and side actuators to control the top and bottom flaps. The shape of the nacelle transitions from a cylindrical shape at the front to a rectangular shape at the rear to accommodate the planar flap design. Pivot actuators are utilized to control the area of the nozzle as shown in FIG. 4. All actuators are used to deploy the thrust reverser as shown in FIG. 5. Adding additional actuators, as seen in FIG. 6, enables the design to be used to provide thrust vectoring.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsor adapted to produce thrust for use in an aircraft, the propulsor comprising an electric motor configured to convert electrical power to mechanical rotation, a fan unit including a nacelle structure and a fan rotor coupled to the electric motor to be rotationally driven by the electric motor about a central axis relative to the nacelle structure, the nacelle structure including a hub arranged along the central axis, a fan case arranged around the fan rotor and the central axis, and a plurality of guide vanes that extend from the hub to the fan case aft of the fan rotor so that all accelerated air discharged from the fan rotor interacts with the guide vanes as all the accelerated air moves through the nacelle structure, and a thrust control system coupled to the nacelle structure and located immediately aft of guide vanes so that the thrust control system is the next structure movable relative to the nacelle structure that interacts with all the accelerated air as the air leaves the nacelle structure, the thrust control system being configured to provide a variable area nozzle and thrust reverser, wherein the thrust control system includes a first flap mounted to rotate about a first-flap axis and a rotation actuator coupled to the first flap to drive movement of the first flap about the first-flap axis, wherein the thrust control system includes a second flap mounted to rotate about a second-flap axis and the rotation actuator is configured to drive movement of the second flap about the second flap axis, and wherein the rotation actuator is housed in the hub of the nacelle structure, the rotation actuator is configured to extend and retract along the central axis, and the rotation actuator is coupled to the first flap and the second flap by links extending out from the hub.

2. The propulsor of claim 1, wherein the fan case is shaped to transition from a round shape portion that extends around the fan rotor to a rectangular shape portion aft of the guide vanes.

3. A propulsor adapted to produce thrust for use in an aircraft, the propulsor comprising an electric motor configured to convert electrical power to mechanical rotation, a fan unit including a nacelle structure and a fan rotor coupled to the electric motor to be rotationally driven by the electric motor about a central axis relative to the nacelle structure, the nacelle structure including a hub arranged along the central axis, a fan case arranged around the fan rotor and the central axis, and a plurality of guide vanes that extend from the hub to the fan case aft of the fan rotor so that all accelerated air discharged from the fan rotor interacts with the guide vanes as all the accelerated air moves through the nacelle structure, and a thrust control system coupled to the nacelle structure and located immediately aft of guide vanes so that the thrust control system is the next structure movable relative to the nacelle structure that interacts with all the accelerated air as it the air leaves the nacelle structure, the thrust control system being configured to provide a variable area nozzle and thrust reverser, wherein the thrust control system includes a first flap mounted to rotate about a first-flap axis and a rotation actuator coupled to the first flap to drive movement of the first flap about the first-flap axis, wherein the thrust control system includes a second flap mounted to rotate about a second-flap axis and the rotation actuator is configured to drive movement of the second flap about the second flap axis, and wherein the first flap and the second flap are each mounted to slide along the central axis relative to the nacelle structure from a first position abutting an aft end of the fan case to a second position spaced apart from the aft end of the fan case.

4. The propulsor of claim 3, wherein the thrust control system includes a first slide actuator coupled to the first flap to drive motion of the first flap along the central axis and a second slide actuator coupled to the second flap to drive motion of the second flap along the central axis.

5. The propulsor of claim 4, wherein the fan case is shaped to transition from a round shape portion that extends around the fan rotor to a rectangular shape portion aft of the guide vanes, the first slide actuator is housed in the rectangular shape portion of the fan case along a top side of the fan case, and the second slide actuator is housed in the rectangular shape portion of the fan case along a bottom side of the fan case.

6. A propulsor comprising a fan unit including a nacelle structure and a fan rotor configured to be rotationally driven by an electric motor about a central axis relative to the nacelle structure, the nacelle structure including a hub arranged along the central axis, a fan case arranged around the fan rotor and the central axis, and guide vanes that extend from the hub to the fan case aft of the fan rotor so that all accelerated air discharged from the fan rotor interacts with the guide vanes as all the accelerated air moves through the nacelle structure, and a thrust control system coupled to the nacelle structure and located immediately aft of the guide vanes so that the thrust control system is the next structure movable relative to the nacelle structure that interacts with all the accelerated air as the air leaves the nacelle structure, wherein the thrust control system includes a first flap mounted to rotate about a first-flap axis and a second flap mounted to rotate about a second-flap axis, and the first flap and the second flap are selectively movable from a first configuration defining a first area through which all the accelerated air passes as the air leaves the propulsor to a second configuration defining a second area through which all the accelerated air passes as it leaves the propulsor, and wherein the first flap and the second flap are each mounted to slide along the central axis relative to the nacelle structure from a first position abutting an aft end of the fan case to a second position spaced apart from the aft end of the fan case.

7. The propulsor of claim 6, wherein the thrust control system includes a rotation actuator configured to drive movement of both the first flap and the second flap about the respective first flap axis and the second flap-axis.

8. The propulsor of claim 7, wherein the rotation actuator is housed in the hub of the nacelle structure, the rotation actuator is configured to extend and retract along the central axis, and the rotation actuator is coupled to the first flap and the second flap by links extending out from the hub.

9. The propulsor of claim 8, wherein the fan case is shaped to transition from a round shape portion that extends around the fan rotor to a rectangular shape portion aft of the guide vanes.

10. The propulsor of claim 6, wherein the thrust control system includes a first slide actuator coupled to the first flap to drive motion of the first flap along the central axis and a second slide actuator coupled to the second flap to drive motion of the second flap along the central axis, wherein the fan case is shaped to transition from a round shape portion that extends around the fan rotor to a rectangular shape portion aft of the guide vanes, wherein the first slide actuator is housed in the rectangular shape portion of the fan case along a top side of the fan case, and wherein the second slide actuator is housed in the rectangular shape portion of the fan case along a bottom side of the fan case.

11. The propulsor of claim 10, wherein the fan case is shaped to transition from a round shape portion that extends around the fan rotor to a rectangular shape portion aft of the guide vanes.

12. The propulsor of claim 11, wherein the first slide actuator is housed in the rectangular shape portion of the fan case along a top side of the fan case, and wherein the second slide actuator is housed in the rectangular shape portion of the fan case along a bottom side of the fan case.

13. An aircraft comprising an airframe, an electric motor, and a propulsor including a fan unit configured to provide accelerated air and a thrust control system configured to provide a variable area nozzle and thrust reverser that interacts with accelerated air from the fan unit, wherein the fan unit includes a nacelle structure and a fan rotor coupled to the electric motor for rotation about a central axis relative to the nacelle structure, wherein the nacelle structure includes a hub arranged along the central axis, a fan case arranged around the fan rotor and the central axis, and guide vanes that extend from the hub to the fan case aft of the fan rotor so that all accelerated air discharged from the fan rotor interacts with the guide vanes as all the accelerated air moves through the nacelle structure, and wherein the thrust control system is coupled to the nacelle structure and located immediately aft of the guide vanes so that the thrust control system is the next structure movable relative to the nacelle structure that interacts with all the accelerated air as it the air leaves the nacelle structure, wherein the thrust control system includes a first flap mounted to rotate about a first-flap axis and a second flap mounted to rotate about a second-flap axis, and the first flap and the second flap are selectively movable from a first configuration defining a first area through which all the accelerated air as the air leaves the propulsor to a second configuration defining a second area through which all the accelerated air passes as the air leaves the propulsor, and wherein the first flap and the second flap are each mounted to slide along the central axis relative to the nacelle structure from a first position abutting an aft end the fan case to a second position spaced apart from the aft end of the fan case.

14. The propulsor of claim 13, wherein the fan case is shaped to transition from a round shape portion that extends around the fan rotor to a rectangular shape portion aft of the guide vanes, the first flap is mounted to slide along the central axis relative to the nacelle structure from a first position abutting an aft end of the fan case along a top side of the rectangular shape portion to a second position spaced apart from the aft end of the fan case, and the second flap is mounted to slide along the central axis relative to the nacelle structure from a first position abutting an aft end of the fan case along a bottom side of the rectangular shape portion to a second position spaced apart from the aft end of the fan case.

15. The propulsor of claim 13, wherein the thrust control system includes a first slide actuator coupled to the first flap to drive motion of the first flap along the central axis and a second slide actuator coupled to the second flap to drive motion of the second flap along the central axis.

\* \* \* \* \*